United States Patent [19]

Kuki et al.

[11] Patent Number: 4,670,824

[45] Date of Patent: Jun. 2, 1987

[54] LIGHT SOURCE UNIT FOR EXPOSURE APPARATUS

[75] Inventors: Kouji Kuki; Tsutomu Kuniyasu, both of Mobara, Japan

[73] Assignee: Hitachi, Ltd., Tokyo, Japan

[21] Appl. No.: 875,445

[22] Filed: Jun. 17, 1986

[30] Foreign Application Priority Data

Jun. 19, 1985 [JP] Japan ............................... 60-131705

[51] Int. Cl.4 ............................................... G03B 41/00

[52] U.S. Cl. ......................................... 362/293; 354/1

[58] Field of Search .................... 354/1; 362/264, 293, 362/257, 263; 313/488; 355/71

[56] References Cited

U.S. PATENT DOCUMENTS

| | | | |
|---|---|---|---|
| 3,648,576 | 3/1972 | Mears et al. | 354/1 |
| 3,694,945 | 10/1972 | Detiker | 362/293 X |
| 4,132,470 | 1/1979 | van Heek | 355/71 X |
| 4,152,154 | 5/1979 | Greenen et al. | 354/1 X |
| 4,351,608 | 9/1982 | Coote et al. | 355/71 X |
| 4,354,746 | 10/1982 | Sagolili et al. | 354/1 |
| 4,414,318 | 11/1983 | Nishizawa | 354/1 X |
| 4,586,799 | 5/1986 | Hayashi et al. | 354/1 |

*Primary Examiner*—Albert W. Davis, Jr.
*Assistant Examiner*—Randolph A. Smith
*Attorney, Agent, or Firm*—Antonelli, Terry & Wands

[57] ABSTRACT

A light source unit for an exposure unit is provided. The unit comprises a cylindrical light-emitting tube and a screen sleeve which has a slit in the circumferential direction and with which the tube is covered through water filled therebetween. According to the invention, the light source unit has the two opposite edges of the slit in the screen sleeve that are in the axial direction partly extended downward to the outer periphery of the light-emitting tube so that a flat exposure pattern is obtained that is small in the radial direction at the periphery of the surface to be exposed to light. Further, a more favorable effect can be obtained by the provision of an attenuating filter on the outer periphery of the screen sleeve for the purpose of shielding a part of the light from the light source in the axial direction.

8 Claims, 9 Drawing Figures

LIGHT SOURCE UNIT FOR EXPOSURE APPARATUS

BACKGROUND OF THE INVENTION

The present invention relates to a light source unit for an exposure apparatus employed for, for example, forming a phosphor screen of a color picture tube.

Conventionally, some exposure apparatus of this type has had a structure such that a cylindrical, light-emitting tube is covered with a screen sleeve having a slit in the circumferential direction and rotated around the vertical axis normal to the axis of the tube, thereby functioning as a spotlight source. In other words, the light source unit thus obtained is arranged on the central normal line of the internal surface forming the phosphor screen of the color picture tube panel so that the slit of the screen sleeve faces the internal surface of the panel and the light from the light source is allowed to pass through a shadow mask with, for example, dotlike apertures whereby exposure patterns, corresponding to dotlike picture elements, are obtained on the photo sensitive film formed on the inner surface of the panel.

In order to prevent the adjoining picture element from being subjected to light from the light source, even when the electron beam irradiating position deviates in the radial direction directing from the center of the panel to the periphery of the panel due to the irregularity of the deflection coil fitting position or the like, it is desirable that the exposure pattern be flat and small especially in the above-mentioned radial direction of the panel, because the space between the adjoining exposure patterns thus becomes large in the radial direction, enabling a sufficient allowance to be obtained for the scattering of the electron beams in the beam direction.

However, the problem arises that, when the light emitting tube which may, for example, be a mercury tube, is separated from the screen sleeve and the space thus created is filled with water for cooling purposes, the degree of flatness of each exposure pattern is reduced.

Thus in the case where, for example, a light source comprising a mercury lamp 1 which is covered with a sleeve 2 and water 3 between the lamp and the sleeve as shown in FIG. 1 is self-rotated in the direction of the arrow, and an arc light 4, passing through a slit 2A, is applied to the inner surface of the panel 6 through a shadow mask 5 as shown in FIGS. 2 and 3; the position exposed in the radial or circumferential direction of the mercury lamp 1 as shown in FIG. 2, viz., the longitudinal direction of the slit 2A differs from the position exposed in the axial direction of the mercury lamp 1, viz., the cross or width direction of the slit 2A as shown in FIG. 3, so that the centers of the two spots 7 and 8 deviate from each other at the periphery of the panel 6 as shown in FIG. 4 and a synthetic exposure pattern 9 defined by a broken line is obtained.

However, since this type of apparatus is of gap type, with the mercury lamp 1 and the sleeve 2 separated as mentioned above, the exposed spot 8 in the axial direction of the mercury lamp deviates toward the periphery of the panel, making the synthetic exposure pattern 3 larger in the radial direction than when the mercury lamp 1 and the sleeve 2 are in close contact.

To prevent problems arising from the directional deviation of the exposure pattern, a method has been proposed, in the U.S. Pat. No. 4,586,799, according to which a saddle-shaped lens is employed. This method is intended to correct the apparent rise of the light source by utilizing the refraction of light through the saddle-shaped lens whose thickness is varied between the axial direction of the light-emitting tube and the direction normal to the axial direction, but the uniform correction of the apparent rise of the light source throughout the entire surface of the panel is not always satisfactory. Accordingly, since the resultant exposure pattern itself becomes a light-emitting position, it has not been possible, heretofore, to employ the rotary exposure system using a large quantity of light for the formation of a black matrix requiring a specifically high degree of accuracy in both position and shape.

SUMMARY OF THE INVENTION

The object of the present invention is to overcome the difficulties involved in the above-mentioned prior art technique and to provide a light source for an exposure apparatus which employs a rotary exposure system using a gap-type light-emitting tube and which can produce a flat exposure pattern of small radial width at the periphery of the surface which is to be exposed to the light from the light source.

In order to attain the above object, the feature of the light source unit for exposure apparatus according to the present invention resides in that the two edges of a slit in a screen sleeve opposing to each other are partially caused to extend in the axial direction toward a light-emitting tube. When, further, an attenuating filter is mounted on the outer periphery of the screen sleeve so as to shield a part of the light applied in the axial direction a more desirable effect can be obtained.

DETAILED DESCRIPTION OF PREFERRED EMBODIMENTS

First Embodiment

Figure 1:
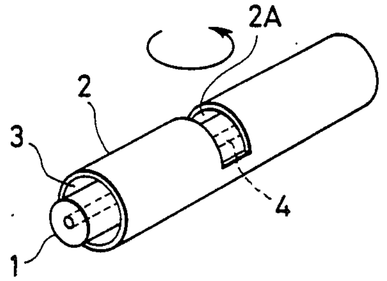
FIG. 1 PRIOR ART
FIG. 1 is a perspective view of a light source unit for an exposure apparatus in a prior art.
Figure 2:
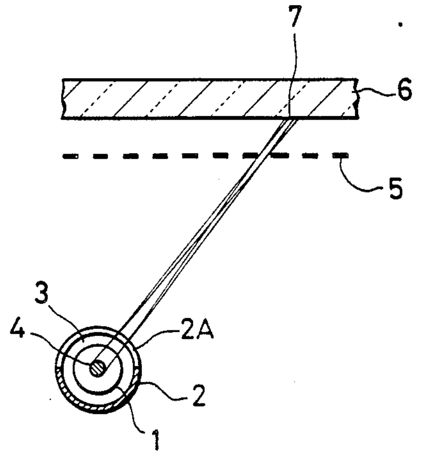
FIG. 2 PRIOR ART
FIGS. 2 and 3 are sketches illustrating the exposure conditions by the light source unit for the exposure apparatus in a prior art.
Figure 3:
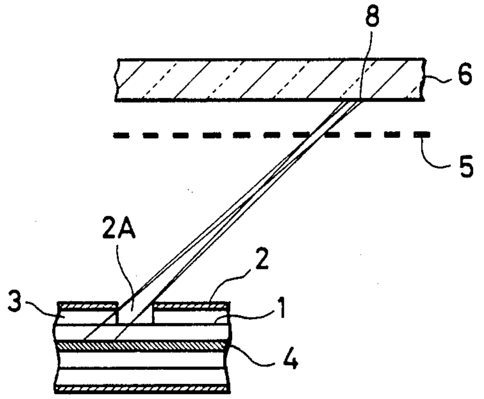
FIG. 3 PRIOR ART
Figure 4:
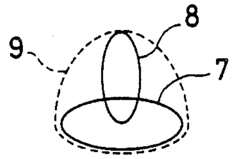
FIG. 4 PRIOR ART
FIG. 4 is a plan view showing an exposure pattern obtained by a light source unit for the exposure apparatus in a prior art.
Figure 5:
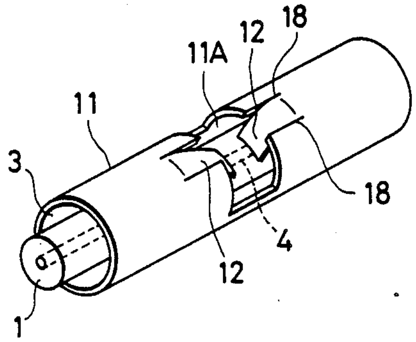
FIG. 5 is a perspective view of a light source unit for an exposure apparatus in an embodiment of the present invention.
Figure 6:
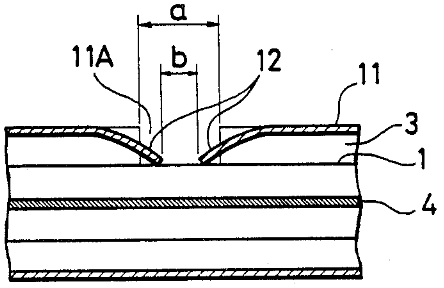
FIG. 6 is an enlarged sketch of the part of the light source unit shown in FIG. 5 which lies in the vicinity of a slit in the light source unit.

Referring to FIG. 5 which is a perspective view of a light source unit for an exposure apparatus according to the present embodiment, a mercury lamp 1 is covered with a screen sleeve 11, which is provided with a slit 11A in the circumferential direction, and the space between the lamp 1 and the sleeve 11 is filled with cooling water. The basic structure of the light source is similar to that of the one shown in FIG. 1 but, in the instant embodiment, the opposite edges of the slit 11A of the sleeve 11 are partly extended in the axial direction toward the mercury lamp 1. The top end of each of the extended portions 12 touches the outer surface of the mercury lamp 1 and the space between both of the portions 12 forms a substantial light source at the time of exposure, in the axial direction so that the same effect is produced as when the contact-type light source is employed and a spot 13 having its center shifted toward the center of a panel of the mercury lamp 1 from the position of the axial direction exposure spot 8 of the conventional light source in FIG. 4 is obtained. Furthermore, in the case of the present embodiment, as shown in FIG. 6, the space b between the above-mentioned extended portions 12 is made narrower than the original slit width a, namely $b<a$, and, therefore, the major axis of the elliptical spot 13 becomes shorter than in the case of employing a slit having a width a as it is, thereby allowing a shorter and more flat synthetic exposure pattern 14 to be obtained. Each of the extended portions is only a part of the edges of the slit 11A while the remainder allows cooling water to flow freely so that the cooling effect of the mercury lamp is not hindered.

In order to facilitate the formation of the extended portion, notches 18 may be provided in the axial direction of the sleeve 11 corresponding to the edges of each of the extended portions 12.

Further, a favorable effect may be obtained if the width of the extended portion 12 is made approximately equal to the diameter of the ark light 4 of a light-emitting tube such as the mercury lamp 1. In addition, a more favorable effect can be obtained if the ratio b/a of the space b between the extended portions with respect to the width a of the slit 11A is made smaller than 1 and larger than 0.7. Generally, it is preferable that the ratio be more than 0.8.

Second Embodiment

Figure 8:
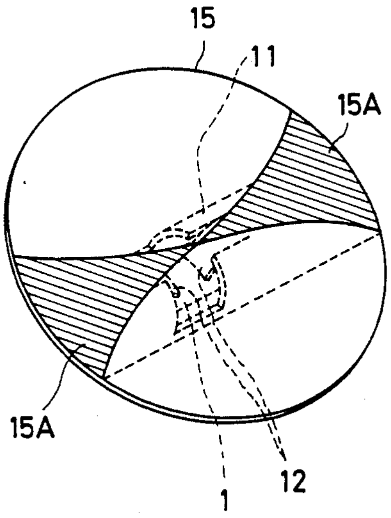
FIG. 8 is a schematic perspective view of the light source unit for the exposure apparatus of another embodiment according to the present invention.
Figure 7:
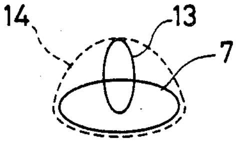
FIG. 7 is a plan view showing an exposure pattern obtained by using the light source unit in an embodiment of the present invention.

FIG. 8 is a schematic perspective view of a second embodiment of the light source unit for the exposure apparatus according to the present embodiment.

Figure 9:
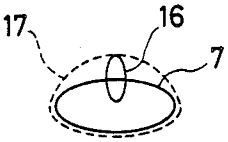
FIG. 9 is a plan view of an exposure pattern obtained by using the light source unit in another embodiment of the present invention.

In the present embodiment, the outer periphery of the sleeve 11 of the above-described structure is further covered with a filter 15. The filter 15 is provided with a light-shielding section 15A capable of shielding a part of the light from the light source unit with respect to the axial direction, as shown by the hatching in FIG. 8. As a result, the exposure is reduced to produce a smaller axial exposure spot 16 than spot 13 and a flatter exposure pattern 17 as shown in FIG. 9 is obtained.

The light shielding section 15A is made in the form of a fan widened toward its end from the center of the slit 11A along the axial direction. Usually, the width of the light shielding section 15A in the vicinity of each of the slit edges is made nearly equal to the diameter of the light-emitting tube such as the mercury lamp 1, but it is possible to adjust the exposure patterns by changing that width.

It is to be noted that, throughout the above-mentioned figures, like parts are designated by like reference numerals.

As described above, according to the present invention, each of the axially opposing edges of the slit of the screen sleeve is partly extended toward the outer peripheral surface of the light-emitting tube so that it is possible to obtain a flat exposure pattern, which is small in dimension in the radial direction even at the periphery of the exposed surface, and it is also possible to obtain a good phosphor screen which has a sufficient allowance for the deviation of the electron beam irradiating direction. Further, by the provision, on the outer periphery of the screen sleeve, of the attenuating filter for shielding a part of the light emitted from light-emitting tube, the effects of the present invention can be enhanced.

What is claimed is:

1. In a light source unit for an exposure apparatus in which a cylindrical light-emitting tube is covered with a screen sleeve having a slit in the circumferential direction and water is filled between the light emitting tube and the screen sleeve, so that when the unit is rotated about an axis normal to the axis of the light-emitting tube, a spotlight source is obtained, the improvement characterized in that two edges of the slit in the screen sleeve opposing to each other along the axis of the screen sleeve are partly extended toward the outer peripheral surface of the light-emitting tube.

2. A light source unit according to claim 1 wherein the width of each of said extended portions is substantially equal to the diameter of the arc light of said light-emitting tube.

3. A light source unit according to claim 2 wherein the ratio of the space between the two extended portions of the opposite edges of the slit of said screen sleeve with respect to the axial width of said slit is smaller than 1 but larger than 0.7.

4. In a light source unit for an exposure apparatus in which a cylindrical light-emitting tube is covered with a screen sleeve having a slit in the circumferential direction and water is filled between the light-emitting tube and the screen sleeve, so that when the unit is rotated about an axis normal to the axis of the light-emitting tube, a spotlight source is obtained, the improvement characterized in that two edges of the slit in the screen sleeve opposing to each other along the axis of the screen sleeve are partly extended toward the outer peripheral surface of the light-emitting tube and an attenuating filter capable of shielding a part of light emitted from the light-emitting tube in the axial direction is mounted on the outer periphery of the screen sleeve.

5. A light source unit according to claim 4 wherein the width of each of said extended portions is substantially equal to the diameter of the arc light of said light-emitting tube.

6. A light source unit according to claim 5 wherein the ratio of the space between the two extended portions of the opposite edges of the slit of said screen sleeve with respect to the axial width of said slit is smaller than 1 but larger than 0.7.

7. A light source unit according to claim 6 wherein a light shielding section of said attenuating filter is in the form of a fan which is widened from the center of said slit toward its end along the axial direction.

8. A light source unit according to claim 7 wherein the width of said light shielding section is substantially equal to the diameter of said light-emitting tube in the vicinity of said edges of said slit.

* * * * *